United States Patent [19]
Betrock

[11] Patent Number: 5,118,123
[45] Date of Patent: Jun. 2, 1992

[54] STANDING/SITTING LAWN MOWER TRAILER

[76] Inventor: Irving Betrock, 14001 E. Palomino Dr., Fort Lauderdale, Fla. 33330

[21] Appl. No.: 706,371
[22] Filed: May 28, 1991
[51] Int. Cl.[5] .............................................. B62D 63/06
[52] U.S. Cl. .................................. 280/32.7; 56/15.6; 280/7.1; 280/63
[58] Field of Search ....................... 180/19.1; 280/32.7, 280/32.5, 63, 65, 416, 415.1, 433, 7.1, 68, 69; 296/69, 65.1, 63; 56/15.6

[56] References Cited

U.S. PATENT DOCUMENTS

| | | | |
|---|---|---|---|
| 1,590,810 | 6/1926 | Cording | 280/32.7 |
| 4,010,507 | 3/1977 | Johnson | 280/32.7 |
| 4,192,525 | 3/1980 | Clark | 280/443 |
| 4,828,282 | 5/1989 | Pinto | 280/32.7 |
| 4,989,351 | 2/1991 | Shear | 280/32.7 |

*Primary Examiner*—David M. Mitchell
*Attorney, Agent, or Firm*—Alvin S. Blum

[57] ABSTRACT

A trailer is provided for hitching to a self-propelled lawn mower. A pair of wheels are rotatably supported at the outer sides of the trailer. An elongate central ridge member supports a pair of foot plates, one on each side of the ridge. A side member extends upward from the lateral edge of each foot plate to securely position the feet of a standing operator. The top surface of the central ridge member supports a pair of veritcal studs that can removably hold in place a seat on a seat standard. A pair of threaded knobs fit into the studs to cover the studs when the seat is not used and to fasten the seat in place when converting from a standing trailer to a sitting trailer. A tubular element within the central ridge member receives an elongate towbar. The towbar is readily adjusted and locked within the tubular element to adjust the spacing between mower handles and seated or standing operator as required. Different towbars are provided for connection to different mowers. The towbar is readily removed for storage and transport.

13 Claims, 1 Drawing Sheet

STANDING/SITTING LAWN MOWER TRAILER

FIELD OF THE INVENTION

This invention relates to trailers that hitch onto self-propelled lawn mowers and more particularly to a trailer that provides for either a seated or a standing rider.

BACKGROUND OF THE INVENTION

Commercially available riding lawn mowers have the advantage over walk behind self-propelled lawn mowers in that they are much less fatiguing to operate. However, they do have many disadvantages. They are large, awkward to store, transport and maneuver into confined areas of the lawn. They are also quite expensive.

To overcome these disadvantages, various wheeled trailers have been proposed that hitch onto the back of walk-behind, self-propelled mowers so that the operator can retrofit the mower to carry the operator behind.

Some of these provide for the operator to stand on the trailer as exemplified by U.S. Pat. No. 4,828,282 issued May 9, 1989 to Pinto. Other trailers are of the sulky type that carries the operator seated as exemplified by U.S. Pat. No. 4,192,525 issued Mar. 11, 1980 to Clark.

There are certain situations where it is more desirable to be seated and other situations where it is more desirable to be standing. None of the trailers of the prior art are designed for ready conversion and effective operation in either standing or sitting mode as desired.

SUMMARY OF THE INVENTION

It is accordingly an object of the invention to provide a wheeled trailer readily retrofitted to any one of the many self-propelled lawn mowers, that is readily converted between a seated and a standing mode of operation without tools or special skills. It is another object that the device be readily adjustable for comfortably reaching the controls and handles of the mower while standing or sitting.

The trailer of the invention comprises an elongate central ridge member with a top plate. The bottom of the central ridge member supports a pair of laterally and horizontally disposed foot plates to support the standing operator. Laterally of each foot plate a wheel is rotatably supported. The top plate of the central ridge supports a pair of vertical studs forward of the foot plates. These vertical studs support a seat standard. The seat standard extends upward and backward to a seat connection that is over the wheels. The seat standard is provided with a vertical adjustment. The seat standard with seat attached is easily installed by laying it onto the vertical studs and securing with two nuts carried in large hand knobs. The forward end of the central ridge member carries a transverse bar that serves as a footrest and a long channel disposed along the long axis of the ridge adapted to receive at its forward end a towbar. Various towbars may be provided to fit onto any of the many different mower geometries and the towbar can be adjustably extended in the channel with a locking pin for securing to accommodate any arm length and handlebar positions.

These and other objects, advantages and features of the invention will become more apparent when the detailed description is studied in conjunction with the accompanying drawings.

DETAILED DESCRIPTION OF PREFERRED EMBODIMENT

Figure 2:
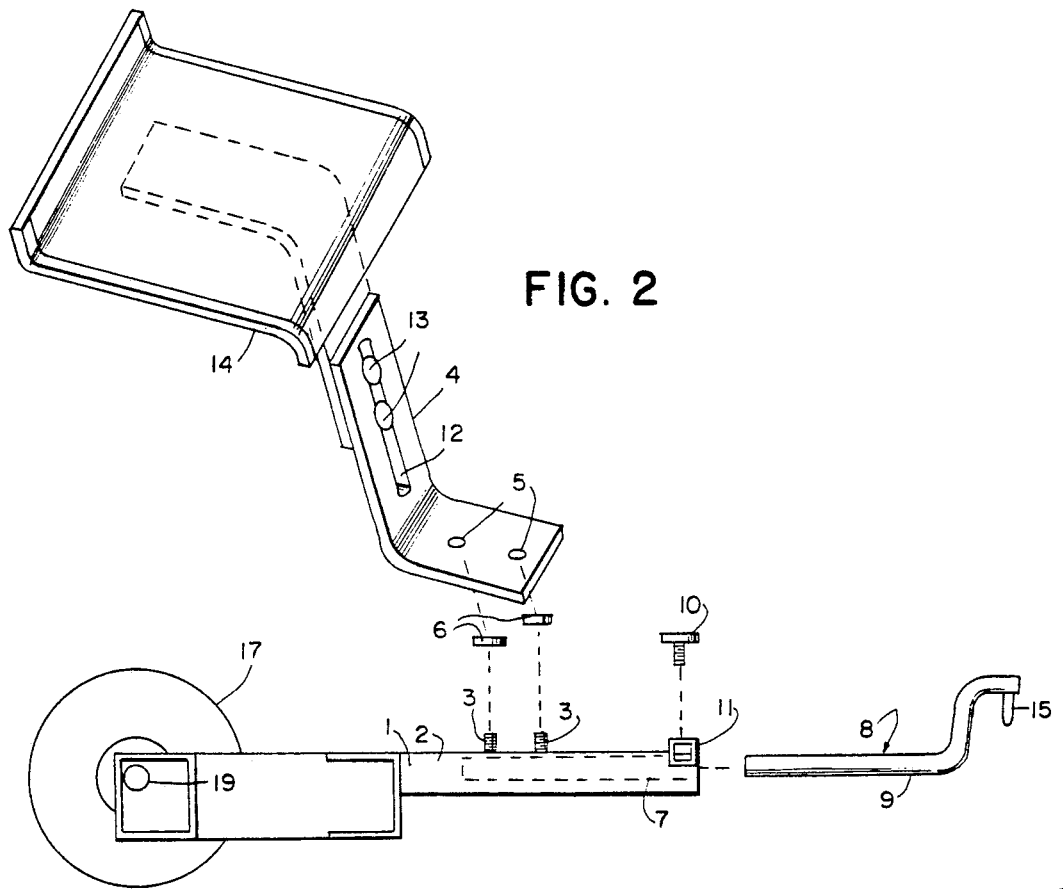
FIG. 2 is a side elevation view of the invention in the standing mode of operation with the seat and seat support in perspective view above and ready for conversion to seated mode of operation.
Figure 1:
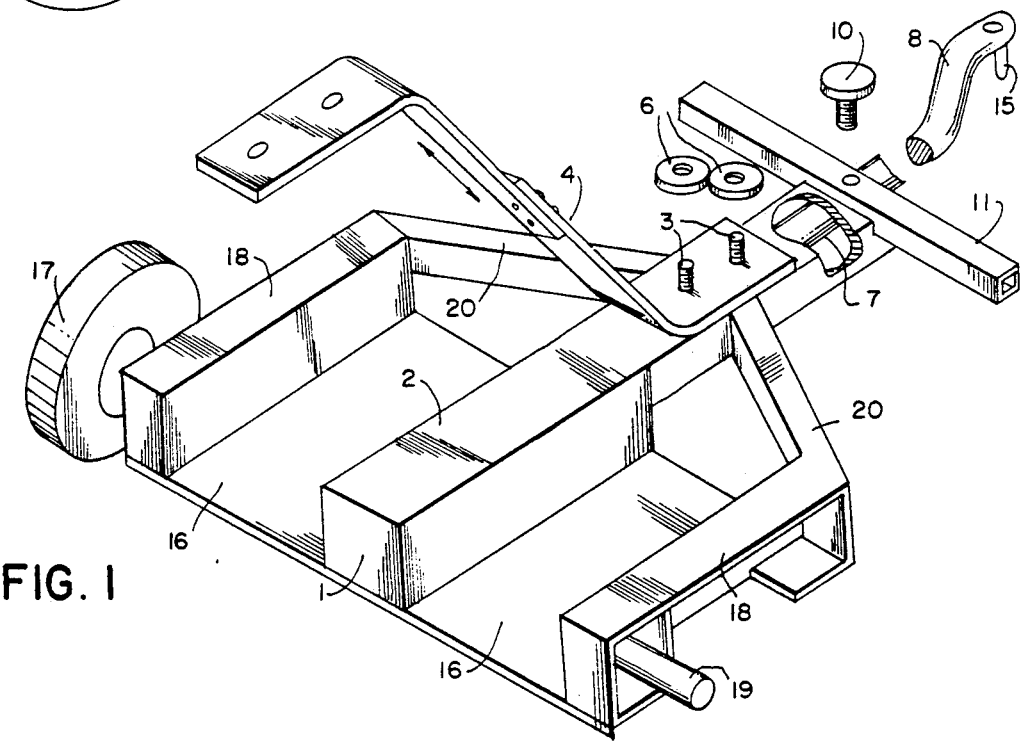
FIG. 1 is a perspective view of the invention in the seated mode of operation absent the seat and one wheel and with a portion broken away.

Referring now to FIGS. 1 and 2, an elongate central ridge in the form of a box member 1 has a top plate 2 that supports two vertical threaded studs 3. A removable seat standard 4 has holes 5 to receive the studs that are then secured with threaded knobs 6. When the seat is not in place, the knobs are kept on the studs. They are large enough to be comfortably turned by hand and they cover the studs for safety. Welded to the underside of top plate 2 at its forward portion is an elongate, sturdy tube 7. This tube is open at its forward end and adapted to receive the straight rear portion 9 of towbar 8, which may be locked in position at any extension length by threaded locking screw 10 that is provided with a large knob head for easy operation without tools. This permits ready adjustment of the distance between the operator and the mower handles for comfortable operation when seated or standing. The seat standard 4 is in two parts with an adjustment slot 12 and locking screws 13 for height adjustment of the seat 14. It extends backward to position the seat over the wheels 17. The towbar is readily removed for convenience in transport and storage, and may be provided in a variety of configurations and end connectors 15 to retrofit the different types of mowers in use.

Extending laterally from the bottom of the central ridge member 1 are a pair of foot plates 16 arranged to comfortably support the feet of a standing operator. Connected to the lateral edges of foot plates 16 are vertical side stiffening members 18 which, together with central ridge member 1 limit the lateral movement of the feet to securely position the operator during the erratic movements normally encountered in use. Transversely arranged axles 19 support a pair of wheels 17 (one removed for clarity of illustration). Diagonal braces 20 connect central ridge member 1 to each side member 18 anteriorly for added strength and rigidity.

Once the vertical height of the seat has been adjusted with screws 13 and the towbar spacing adjusted with screw 10, the operator can convert between seated and standing operation by simply unscrewing knobs 6, and putting on or removing seat standard 4 with its seat and replacing the knobs 6. This is also very convenient for the commercial lawn serviceman who may repeatedly move his truck form job site to job site and may encounter situations where a different mower must be used for each job and some situations may be better handled seated and others standing. The operator can readily switch between mowers as well as between sitting and standing. At most, a different style towbar may be carried for alternate mowers with different connectors as required without duplicating the whole trailer.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A convertible trailer for hitching onto a self-propelled, walk-behind lawn mower to provide for carrying an operator in sitting and standing positions in two alternate modes of operation, said trailer comprising:
   a) a towbar having a front portion provided with mower hitching means for removably connecting to a lawn mower and an elongate, straight rear portion;
   b) an elongate central box member having a top plate, a bottom plate and a long axis with a forward end and a rear end;
   c) an elongate tubular towbar receiving means enclosed within said box member arranged along said long axis and having an opening at the forward end of said box member for removably receiving therein an adjustable fraction of said straight rear portion of said towbar to thereby adjust the distance between said mower and said operator when riding on said trailer;
   d) towbar securing means extending through said top plate of said box member for removably locking said towbar in place in said towbar receiving means;
   e) a pair of horizontal foot plates, each extending laterally from one side of said central box member at said bottom plate, each foot plate extending forward from the rear end of said box member to a point intermediate the front and rear ends of said central box member;
   f) a pair of vertical side members, one connected to the lateral edge of each foot plate and extending upward therefrom, whereby a secure foot space is defined by a foot plate at the bottom bounded on one side by said central box member and on a second side by a vertical side member;
   g) a pair of wheels for supporting said trailer;
   h) axle means arranged at right angles to said long axis and proximate said rear end thereof and extending laterally past said side members, for rotatably supporting said pair of wheels;
   i) a seat standard with a seat attached at one end thereof; and
   j) fastening means on said top plate for removably securing thereto said seat standard, said seat thereby being positioned substantially over said wheels when so secured, whereby said trailer is converted from standing to sitting mode by connection of said seat standard.

2. The trailer according to claim 1, in which said seat standard has a first, seat attaching end that is substantially horizontal, an intermediate portion that extends downward and forward at a slanting angle and a second, trailer-attaching end that is substantially horizontal and extending forward, said trailer attaching end provided with attaching means arranged to cooperate with said fastening means on said top plate of said box member for readily changing between sitting and standing modes of operation.

3. The trailer according to claim 2, in which said fastening means includes at least one threaded stud extending vertically from said top plate and a threaded hand knob cooperating therewith and said attaching means includes at least one hole for receiving said stud.

4. The trailer according to claim 3, in which said seat standard is provided with vertical height adjustment in said intermediate portion.

5. The trailer according to claim 4, further comprising a footrest extending transverse to said long axis at said forward end for use when seated.

6. The trailer according to claim 5, further comprising a pair of connecting beams, each one of said beams connecting to the forward end of a side member and extending forward and centrally therefrom and connecting to said central box member for enhanced rigidity.

7. The trailer according to claim 6, further comprising a plurality of towbars, each provided with a different mower hitching means for cooperating with different mower connections.

8. A convertible trailer for hitching onto a self-propelled, walk-behind lawn mower to provide for carrying an operator in sitting and standing positions in two alternate modes of operation, said trailer comprising:
   a) a towbar having a front portion provided with mower hitching means for removably connecting to a lawn mower and an elongate, straight rear portion;
   b) an elongate central frame member having a long axis with a forward end and a rear end;
   c) an elongate tubular towbar receiving means enclosed within said frame member arranged along said long axis and having an opening at the forward end of said box member for removably receiving therein an adjustable fraction of said straight rear portion of said towbar to thereby adjust the distance between said mower and said operator when riding on said trailer;
   d) towbar securing means extending through said frame member for removably locking said towbar in place in said towbar receiving means;
   e) a pair of horizontal foot plates, each extending laterally from one side of said central frame member, each foot plate extending forward from the rear end of said frame member to a point intermediate the front and rear ends of said central frame member;
   f) a pair of wheels for supporting said trailer;
   g) axle means arranged at right angles to said long axis and proximate said rear end thereof and extending laterally past said foot plates, for rotatably supporting said pair of wheels;
   h) a seat standard with a seat attached at one end thereof; and
   i) fastening means on said frame member for removably securing thereto said seat standard, said seat thereby being positioned substantially over said wheels when so secured, whereby said trailer is converted from standing to sitting mode by connection of said seat standard.

9. The trailer according to claim 8, in which said seat standard has a first, seat attaching end that is substantially horizontal, an intermediate portion that extends downward and forward at a slanting angle and a second, trailer-attaching end that is substantially horizontal and extending forward, said trailer attaching end provided with attaching means arranged to cooperate with said fastening means on said frame member for readily changing between sitting and standing modes of operation.

10. The trailer according to claim 9, in which said fastening means includes at least one threaded stud extending vertically from said top plate and a threaded hand knob cooperating therewith and said attaching means includes at least one hole for receiving said stud.

11. The trailer according to claim 10, in which said seat standard is provided with vertical height adjustment in said intermediate portion.

12. The trailer according to claim 11, further comprising a footrest extending transverse to said long axis at said forward end for use when seated.

13. The trailer according to claim 12, further comprising a plurality of towbars, each provided with a different mower hitching means for cooperating with different mower connections.

* * * * *

UNITED STATES PATENT AND TRADEMARK OFFICE
CERTIFICATE OF CORRECTION

PATENT NO. : 5,118,123
DATED : June 2, 1992
INVENTOR(S) : Irving Betrock

It is certified that error appears in the above-identified patent and that said Letters Patent is hereby corrected as shown below:

Col. 4, line 36, claim 8,    delete "box" and substitute

- - frame - -.

Signed and Sealed this

Thirteenth Day of February, 1996

Attest:

BRUCE LEHMAN

Attesting Officer    Commissioner of Patents and Trademarks